Patented Jan. 16, 1940

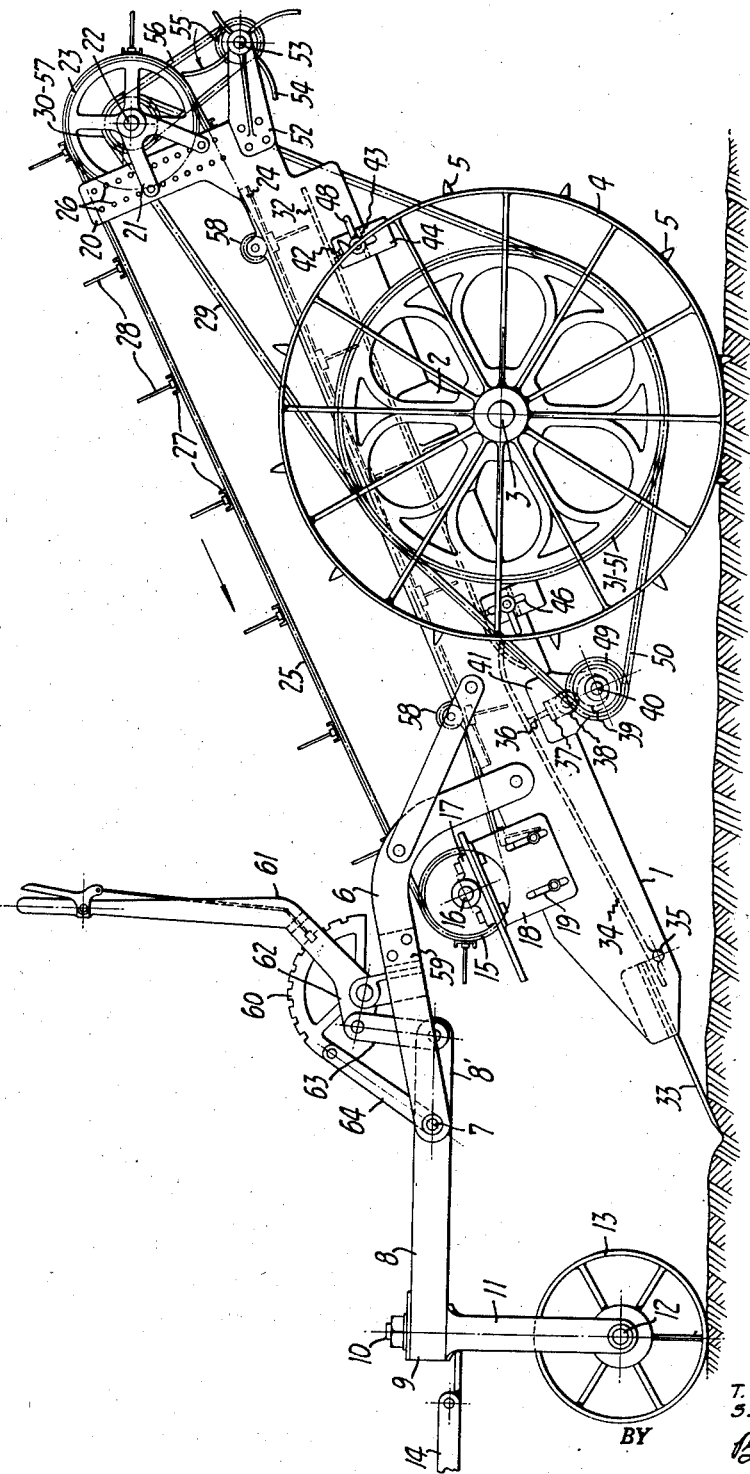

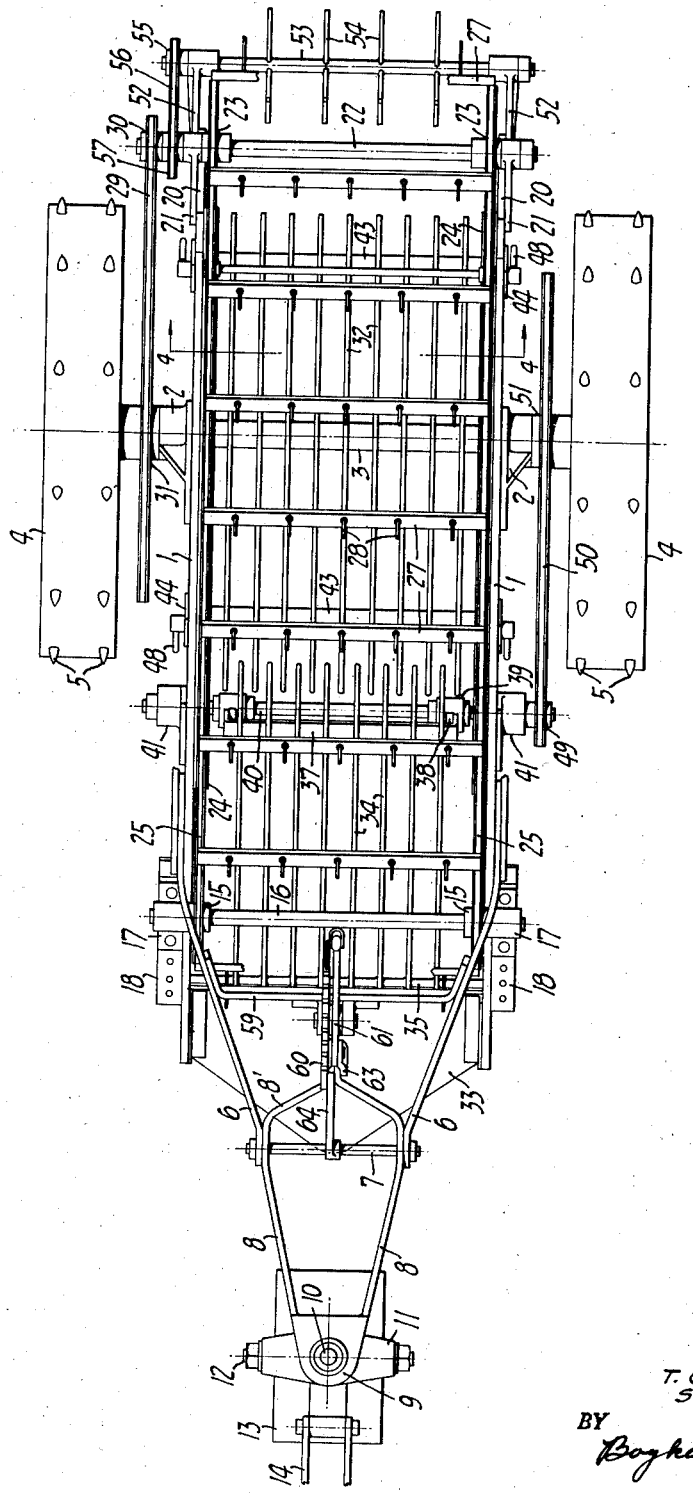

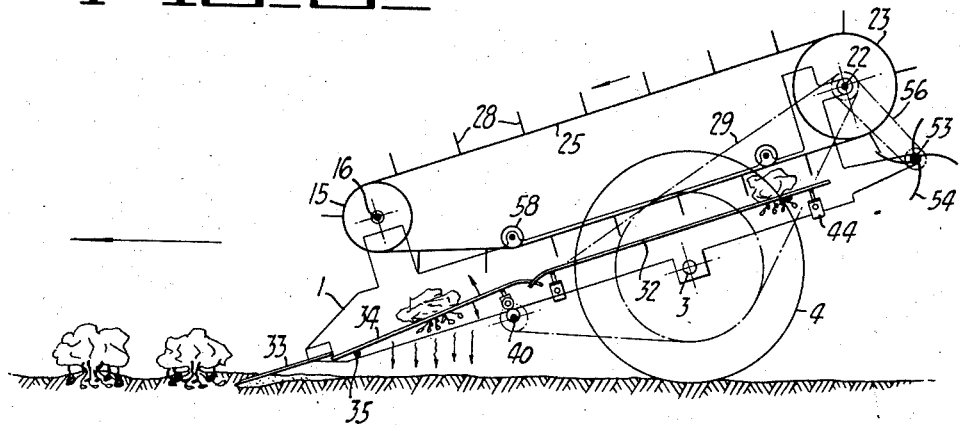
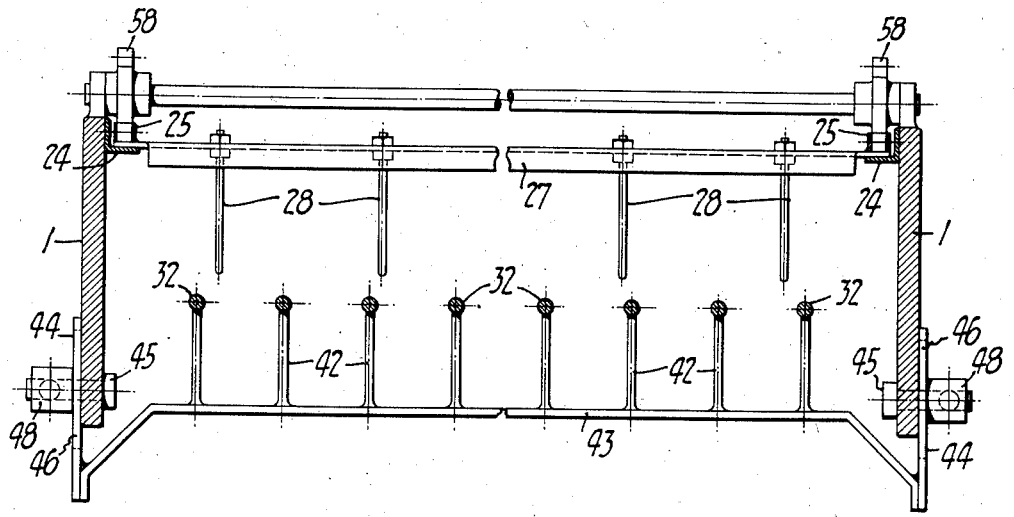

2,187,206

UNITED STATES PATENT OFFICE 2,187,206

PEANUT HARVESTER

Thomas C. Lloyd-Jones and Samuel E. Kinnear, Modesto, Calif.

Application March 5, 1938, Serial No. 194,217

7 Claims. (Cl. 55—138)

This invention relates to peanut harvesters and has for its objects a machine for digging peanuts from the ground and for removing the dirt from the pods and from the roots of the plants while the pods remain attached to the stems connecting them to the plants without breaking the pods loose from the stems or injury to the pods. Other objects and advantages will appear in the description and claims annexed hereto.

In the drawings Fig. 1 is an elevational view of the machine.

Fig. 2 is a plan view of the machine.

Fig. 3 is a semi-diagrammatic view showing the arrangement of the principal elements of the invention in a manner to more clearly illustrate its manner of operation.

Fig. 4 is a fragmentary sectional view along the line 4—4 of Fig. 2.

In detail, the machine as illustrated in the drawings, comprises a pair of opposed, generally horizontally extending side frame members 1 each provided with a bracket 2 secured thereto and depending therefrom at a point intermediate the ends thereof, said brackets being opposed to each other and supporting a transverse axle 3 at the lower ends thereof, which axle carries wheels 4 at its ends outwardly of the side frame members for supporting the frame for movement over the ground, one or both of which wheels may be provided with traction elements 5 around the peripheries thereof.

A pair of arms 6 are secured to the forward ends of the side frame members, one arm to each member, said arms extending vertically from the members and then curving forwardly and extending convergently and generally horizontally to a point over the forward end of the machine where they are connected by a cross rod 7 at their forward ends. Arms 8 are pivotally connected to the cross rod 7 and extend convergently forwardly from said bar to connect at their forward ends with a bearing 9 that is journaled to rotatably receive a vertical shaft 10. The shaft 10 carries a vertically disposed yoke 11 depending therefrom, and the lower ends of the yoke arms carry an axle 12 that rotatably mounts a forward ground wheel 13 thereon between said arms. A draw bar 14 connects with the upper end of said yoke to provide means for drawing the machine over the ground.

A pair of sprockets 15 are secured on a horizontal cross shaft 16 extending above and across the frame of the machine, which shaft is rotatably supported at its opposite ends in bearings 17, which bearings are bolted to side plates 18 that are bolted to the side frame members. Plates 18 are vertically slotted at 19 to pass the bolts that secure the plates to the frame members, thus permitting vertical adjustment of the bearings relative to the frame members, and the plates 18 respectively are provided with a horizontal row of pairs of bolt holes for receiving a pair of bolts from each bearing for bolting the bearings to the plates, thus permitting the bearings to be bolted in a plurality of horizontal positions relative to the plates according to which pair of bolt holes in said plates are in register with the bolt holes in the bearings.

At the rear end of the frame and bolted to the rear ends of the side frame members are plates 20 extending upwardly from said side frame members. To each of the plates 20 is bolted a bracket 21, journaled to receive the ends of a horizontal cross shaft 22, which shaft carries sprockets 23 secured thereto.

The sprockets 15, 23 adjacent each of the side frame members are in a vertical plane parallel with the side frame members, which plane is adjacent the inner opposed sides of the side frame members, and an angle bar 24 is bolted to the inner side of each of the side frame members extending longitudinally thereof for slidably supporting the lower, generally horizontally extending run of an endless chain 25 passing over the sprockets 15, 23.

The brackets 21 are vertically adjustable on plates 20 by virtue of the vertical rows of holes 26 in said plates for registering, as desired, with pairs of holes in the brackets for passing bolts therethrough as best indicated in Fig. 1.

From the foregoing it will be seen that the sprockets 15, 23 may be raised or lowered to meet varying conditions and likewise the shafts 16, 22 may be moved toward or away from each other by changing the position of the bearings 17, and by removing or adding links to the chains 25 in the usual manner since the chains are conventional sprocket chains of the type in which the links are readily removable.

At uniformly spaced intervals along the length of chains 25 said chains are connected by cross bars 27, each of which cross bars carries a row of spaced outwardly projecting fingers 28. The chains 25 and the cross bars and fingers thereon are caused to move in the direction of the arrow (Fig. 1) by a sprocket chain 29 that passes over sprocket 30, which is secured on one of the ends of shaft 22 that projects outwardly of the bearing 21 adjacent thereto and a relatively greater diameter sprocket 31 that is secured to one of the wheels 4 for revolving with the latter.

Spaced below the cross bars 27 on the lower runs of chains 25 are a plurality of parallel spaced, elongated rods 32 arranged in a row extending between the side frame members 1 and which rods extend longitudinally of the frame members and of the normal direction of movement of the machine, which rods are disposed with pairs thereof at opposite sides of each of the downwardly directed fingers 28, which fingers thus move longitudinally of the bars above the spaces between the latter when the machine is moved over the ground. The fingers preferably do not extend between the pairs of rods 32, but are above the plane of said rods, although they may be adjusted to project past the planes of the rods.

Projecting forwardly of the forward ends of the side frame members 1 and extending between said forward ends is a digging blade or shovel 33 having a forwardly facing cutting edge of V-shape with the apex centrally thereof between the lateral sides of said shovel, which sides are secured to the forward ends of the side frame members, as by bolting thereto.

The digging shovel 33 is positioned forwardly an appreciable distance from the forward free ends of rods 32 and in the space between the rods 32 and shovel is a rack or grill comprising rods 34 extending forwardly and downwardly from the free ends of rods 32 to a position at their forward ends below the rear end of the shovel and their rearward ends are slightly above the forward ends of rods 32 and, which forward ends of rods 32 are slightly curved downwardly. The rods 34 are disposed substantially in extension of the rods 32 and said rods 34 are secured at their forward ends to a cross bar 35, which bar is pivoted at its ends on the front ends of the side frame members, which cross bar also holds the rods 34 in spaced relation at their forward ends.

The rear ends of rods 34 respectively are supported on generally vertical posts 36, one post depending from below each rod, and the lower ends of said posts are secured to and supported on a cross bar 37. At its ends, the cross bar 37 is provided with rollers 38 that are rotatable on a horizontal axis, which rollers each ride on top of a cam 39 at each side of the machine. Cams 39 are secured on a cross shaft 40, which shaft is rotatably mounted at its ends in bearings carried by hangers 41, said hangers being bolted to and depending from the side frame members 1.

The rods 32 are supported on vertical posts 42 depending therefrom, and to which the rods are secured, said posts being secured at their lower ends to cross bars 43. The posts 42 are arranged in transverse rows at opposite ends of the rods 32 and said cross bars are provided with brackets 44 at their ends for securing the cross bars to the side frame members with the brackets at the outer sides of said frame members. The frame members each carry stud bolts 45 directed horizontally outwardly of the outer sides thereof, which stud bolts are adapted to pass through vertical slots 46 in brackets 44, and a nut with a handle 48 secured therein is threaded onto the outwardly projecting ends of bolts 45 for quickly releasing and tightening the nuts to thereby permit rapid vertical raising or lowering the cross bars 43 as may be desired for raising and lowering the opposite ends of rods 32 to best meet the varying conditions.

The posts 36, 42 are of lesser thickness than the thickness of rods 34, 32 for a reason later described, and the outermost rods 32 of the row of said rods are disposed almost against the inner sides of the side frame members. Also, posts 36, 42 are preferably from about 6 to 8 inches in length to support the rods 34, 32 well above cross bars 37, 43.

The cam 39 is rotated by means of a sprocket 49 on shaft 40, which sprocket is connected by sprocket chain 50 with a relatively larger diameter sprocket 51 that is connected with one of wheels 4 to rotate therewith. Thus upon moving the machine forwardly the cam 39 will cause the rear ends of rods 34 to rapidly oscillate vertically about the axis of cross rod or shaft 35 with progressively increasing length of movement from the forward ends of rods 34 toward their rear ends, but at the lowest end of movement of the rods 34, their rear ends do not drop below the forward ends of rods 32.

At the rear ends of cross frame members 1 are secured rearwardly projecting plates 52 journaled at their rear ends to rotatably mount the ends of a shaft 53, which shaft is parallel with shaft 22 and below the latter. Said shaft 53 carries equally spaced sets of rod-like arms 54 extending generally radially outwardly thereof, which sets of arms are disposed in alignment with the spaces between the pairs of fingers 28 of each of said transverse row of said fingers. The arms 54 are preferably curved from their inner ends toward their outer ends in a direction opposite to the directional movement of said arms, and the arms are caused to revolve about the axis of shaft 53 in the direction of the arrow (Fig. 1) by means of a sprocket 55 secured on shaft 53 adjacent one of its ends and a sprocket chain 56 which connects between sprocket 55 and a sprocket 57 on fixed end of shaft 22.

In order to hold down the lower run of chain 25 substantially against angle bars 24, we provide rollers 58 at points over said lower run adjacent sprockets 15, 23, which rollers are rotatably mounted on bearings secured to the side frame members 1.

Between arms 6 at the forward end of the machine is a cross bar 59, which bar is secured at its ends to the arms. Said cross bar carries a segment 60, having ratchet teeth thereon, and pivotally supports a hand lever 61, which lever carries a dog releasably engaging the ratchet teeth. The handle is pivotally connected with the cross bar at one end adjacent the segment and the arm continues past the pivot in the form of a crank arm 62, the outer end of which crank arm pivotally connects by a link 63 with a rearward continuation 8' of the arms 8 rearwardly of rod or shaft 7. In order to more rigidly support said segment we provide a brace 64 connecting between segment 60 and cross shaft 7.

Thus upon moving handle 61 forwardly at its outer end the shovel 33 will be lowered to digging position, while upon moving the handle oppositely the shovel will be raised to clear the ground.

In operation, the shovel is lowered to digging position with the cutting edge moving through the ground in a plane sufficiently below the pods to prevent cutting the latter from the stems and plant. The earth surrounding the pods and stems as well as other earth at the roots of the plants is carried over the shovel and onto the rods 34, together with the plant, stems, pods and at least some of the roots. Upon passing from the shovel onto said rods, the loose earth will immediately drop between the rods back to the surface of the ground, and the earth adhering to the pods, stems and roots will be shaken from the same as the plants move rearwardly, the degree of agitation or oscillation thereof progressively becoming greater as the plants move from the forward ends of rods 34 to the rear ends thereof, and the lowermost pods on the plant will dangle loosely in the spaces between the pairs of rods without other support than from the stems which connect them with the plants, thus there is no striking or dragging of the pods on a surface or surfaces during their rearward movement. The posts 36 are of lesser thickness than rods 34, so there is no interference with said posts.

Fingers 28 on chains 25 engage the plants adjacent the forward ends of rods 32 and with the pods still suspended from the plant the same as when the plants were on rods 34, said plants and the pods will be moved rearwardly over rods 32 to finally be discharged from the machine at its rear end with the arms 54 functioning to free the plants from any possible attachment to fingers 28.

The progressively increased shaking of the plants on rods 34 is important since the earth is gradually shaken from the pods. If the pods were subjected to a severe shaking when the major portion of the dirt was adhered thereto, the added weight on the pods would tend to snap the pods from the stems. Also were the pods dragged over a grill or roughened surface or any other surface, a great number of pods would be lost, while with our device there is no dragging of the pods over any surface, and earth loosened from the pods or plants or roots immediately drops directly onto the ground out of the path of the pods.

It is obvious in the construction of our machine that a seat for a rider may be positioned at any convenient place on the machine, such as over one of the side frame members, and likewise, the machine itself may be provided with its own power plant for driving the ground wheels, and the various moving elements on the machine, such as the chains, may be power driven from an engine or motor, if desired, instead of being driven from the ground wheels. The rods 32, 34 may be tubular, such as pipe, or they may be solid rods or metal strips, and the term "rods" as used in the claims is intended to cover any such construction unless otherwise specified; however, cylindrical rods or pipes are preferable to avoid sharp edges and to reduce friction as well as for economy of manufacture.

Having described our invention, we claim:

1. A peanut harvester comprising a frame having spaced, opposed side members and ground wheels supporting said frame for movement horizontally over the ground in one direction, a transverse earth digging shovel on the frame extending across the space between said side frame members having a cutting edge along the forward side thereof to the directional movement of the frame, a horizontal row of spaced rods having one of their ends disposed adjacent the side of the shovel opposite the cutting edge disposed to receive peanut plants and pods dug from the ground by said shovel, means pivotally supporting said ends of said rods for vertical swinging of the rods about a horizontal axis adjacent said ends and means supporting the opposite ends of said rods elevated above the first mentioned ends, means on the frame for oscillating said opposite ends vertically, a second horizontal row of spaced rods on said frame arranged with the rods of said second row extending rearwardly from said opposite ends of the rods of the first mentioned row, the adjacent ends of the rods of the first mentioned row and said second row being disposed in lateral overlapping relation for providing a continuous support for plants dragged from the first mentioned row to over said second row at said adjacent ends, means rigidly supporting the rods of said second row relative to the frame and to the oscillatory movement of the first mentioned row of rods, plant engaging means over said second row of rods arranged and adapted to engage plants supported on said second row for moving the plants over the rods longitudinally thereof in a direction away from said shovel, and means at the ends of the rods of said second row opposite said adjacent ends arranged and adapted to remove the plants from engagement with said plant engaging means.

2. In a construction as defined in claim 1, said plant engaging means comprising opposed endless sprocket chains disposed adjacent said side members and at an elevation above the plane of said second row of rods, sprockets mounting said frames on said side members, cross bars secured at their opposite ends to said chains, and fingers secured on said cross bars projecting in a direction outwardly therefrom relative to the chains and means for moving the chains to cause movement of the fingers nearest the rods of said second row rearwardly relative to the directional movement of the frame.

3. In a peanut harvester, a plurality of open, grill-like racks for supporting peanut plants thereon for sliding movement of the plants thereover, said racks each comprising a horizontal row of parallel, spaced, elongated bars and the racks arranged with their bars substantially in longitudinal extension with their adjacent ends close together to form a continuous supporting surface upon sliding the plants from one rack onto another and plant engaging means for dragging the plants over the racks in a direction longitudinally of the bars, means for digging the peanut plants with the pods attached thereto and for carrying the plants from said means to one of said racks for engagement by said plant engaging means and means for vertically oscillating the bars of the last mentioned rack for dangling the pods on plants on said rack in the spaces between the bars whereby the earth will be loosened from said pods for falling therefrom.

4. In a wheel mounted peanut harvester, a digging member for digging up the peanut plants with the pods attached thereto, a plurality of horizontally spaced, parallel, longitudinally inclined rods extending upwardly from the digging member and positioned to receive the plants from the digging member for sliding of the plants longitudinally of the rods and upwardly away from said digging member, means over said rods mounted for movement in a path longitudinally of the rods and in a direction away from said digging member, said means including fingers arranged and adapted to engage the plants on the rods for dragging the plants upwardly on said rods and over the upper ends of the rods, means at the upper ends of the rods arranged and adapted to disengage the plants from said fingers, and means for causing said movement of the fingers.

5. In a wheel mounted harvester a digging member for digging up the peanut plants with the pods attached thereto, a plurality of horizontally spaced, parallel, longitudinally inclined rods extending upwardly from the digging member and positioned to receive the plants from the digging member for sliding of the plants longitudinally of the rods and upwardly away from said digging member, an endless carrier device extending longitudinally of the rods and spaced thereabove, including rotatable members adjacent the upper and lower ends of the rods mounting said carrier for movement of the length thereof nearest said rods in a direction longitudinally of the rods and away from the digging member, means for causing said movement, fingers on said carrier projecting outwardly therefrom arranged and adapted to engage the plants on the rods for sliding the plants upwardly on said rods, and means mounting said rotatable members for movement to a plurality of fixed positions toward and away from said rods whereby the space between said length of the carrier and the rods may be varied.

6. In a wheel mounted harvester, a digging member for digging up peanut plants with the pods attached thereto, a plurality of horizontally spaced, parallel, longitudinally inclined rods extending upwardly from the digging member and positioned to receive the plants from the digging member for sliding of the plants from the digging member longitudinally of the rods and upwardly away from said digging member, an endless carrier device extending longitudinally of the rods and spaced thereabove, including rotatable member adjacent the upper and lower ends of the rods mounting said carrier for movement of the length thereof nearest said rods in a direction longitudinally of the rods and away from the digging member, means for causing said movement, fingers on said carrier projecting outwardly therefrom arranged and adapted to engage the plants on the rods for sliding the plants upwardly on said rods, and means guiding said length convergently toward said rods in direction extending away from said digging member and then substantially parallel with said rods and spaced thereabove for the remainder of the length of said rods in direction toward their upper ends.

7. In a construction as defined in claim 6, said rods being in two sets one of which sets is disposed below the parallel portion of said length of the carrier and the other set being positioned below the said convergently extending length of the carrier, means for vibrating the said other set for shaking dirt loose from plants adapted to be supported on said other set, and the adjacent ends of the sets of rods being positioned relatively to provide for unobstructed passage of the plants from the one set to the other upon the plants being dragged over the rods by said fingers.

THOMAS C. LLOYD-JONES.
SAMUEL E. KINNEAR.